Oct. 7, 1969   J. B. TITUS   3,471,084
TRIGONOMETRIC AERONAUTICAL COMPUTER, TRAC
Filed Feb. 28, 1968   4 Sheets-Sheet 1

INVENTOR.
JACK B. TITUS
BY Harry A. Herbert Jr.
ATTORNEY

Arthur R. Parker
AGENT

Oct. 7, 1969 J. B. TITUS 3,471,084
TRIGONOMETRIC AERONAUTICAL COMPUTER, TRAC
Filed Feb. 28, 1968 4 Sheets-Sheet 2

INVENTOR.
JACK B. TITUS
BY Harry A. Herbert Jr
ATTORNEY
Arthur R. Parker
AGENT

Oct. 7, 1969  J. B. TITUS  3,471,084
TRIGONOMETRIC AERONAUTICAL COMPUTER, TRAC
Filed Feb. 28, 1968  4 Sheets-Sheet 2

INVENTOR.
JACK B. TITUS
BY Harry A. Herbert Jr
ATTORNEY

Arthur R. Parker
AGENT

# United States Patent Office 3,471,084
Patented Oct. 7, 1969

3,471,084
TRIGONOMETRIC AERONAUTICAL COMPUTER, TRAC
Jack B. Titus, Citrus Heights, Calif.
(904th AREFS Sq., Mather AFB, Calif. 95655)
Filed Feb. 28, 1968, Ser. No. 708,909
Int. Cl. G06c 27/00
U.S. Cl. 235—78                                                         9 Claims

ABSTRACT OF THE DISCLOSURE

An air navigation computer white base disc element inscribed with two logarithmic scales rotatably supports about a pivot center a transparent trig ring inscribed with a pair of trigonometric, logarithmic scales. A transparent cursor ring inscribed with a single radial reference line and fitted into a recessed portion formed in the top surface of the trig ring is normally slaved to the rotation of the trig ring and, furthermore is held in position thereto by means of a white compass indicator mounted on the pivot center above the cursor ring. The compass indicator is held stationary relative to the base disc element by means of a relatively small internal disc element that is laminated to the underside of the compass indicator. This internal disc element presses downwardly against a relatively enlarged internal friction disc element when the computer is assembled, which friction disc element presses both at its center portion against the base disc element and engages with the trig ring at its circumference to thereby firmly press the trig ring downwardly against the upper surface of the base disc element.

A transparent relative bearing pointer disc inscribed with degree values from 0–180° in both clockwise and counterclockwise directions and having a curved extension portion with a hairline is rotatably mounted over the compass indicator for adjustment about the computer pivot center. A pair of transparent cursor pointers are positioned immediately over the relative bearing pointer for rotation about the pivot center and each incorporates a curved tip portion that overlaps and presses firmly downwardly upon the circumferential edge of the base disc element.

Background of the invention

This invention relates generally to the field of air navigation computers and, in particular, to aerial computers involving the use of the circular slide rule principle for computing the position and track of an aircraft by the technique known as dead reckoning.

In dead reckoning navigation, the pivot and/or navigator is particularly concerned with the actual track that the aircraft is traveling over the earth's surface, and with the instantaneous position of the aircraft at all times. This may be accomplihsed by reference to a known position and then plotting the aircraft heading or headings, the distance flown on each heading, and periodically correcting certain navigational data for changes in the environmental conditions of air temperature, and altitude or pressure. Although it is possible to solve the principal problems of air navigation by manually drawing to scale what is known as a triangle of velocities or the wind triangle to determine, for example, what heading should be flown by the aircraft to make good a desired track or true course over the earth's surface and, in addition, what the ground speed is for a particular airspeed; in practice and particularly where relatively fast and/or long range aircraft flights are involved, the innumerable calculations required to accurately, rapidly and continually navigate such aircraft makes the use of the hand drawn triangle of velocities impractical.

To facilitate the solution of the essential problems involved in aerial navigation and thereby greatly assist the pilot/navigator in the performance of his duties, many and varied types of navigational computers have long been developed. These computers have generally involved the circular slide rule and typically included a slide member that may be marked, for example, with units of time, or units of speed and drift correction angles. They also frequently include one or more logarithmic scales graduated in miles or kilometers, and time in minutes and hours. In addition, such previously developed computers often include some means of converting indicated, calibrated airspeed to true airspeed, and altimeter readings to true altitude. Naturally, it is desirable that such aerial computers be as simplified and as easy to operate as possible, preferably with one hand, particularly to permit the pilot who must also act as navigator to easily solve the many problems involved in navigating his aircraft. To this end, the present invention constitutes a significant improvement in uniting in one device various unique means for solving the essential navigational problems of aircraft flight and which is both particularly adaptable to relatively slow speed and fast speed aircraft and is specifically applicable to use with tactical air navigation (TACAN).

Summary of the invention

A principal object of the present invention, therefore, resides in a new aerial computer especially adapted for computing the dead reckoning position and track of an aircraft by means of an improved system of logarithmic scales providing novel and simplified means for solving aircraft navigational problems and which involves, for example, the conversion of airspeed to groundspeed, and the computed track of the aircraft for a given true heading.

Another object of the invention is in the use of an improved air navigation computer that incorporates a unique combination of conventional logarithmic scales inscribed on a stationary mount, and an improved arrangement of trigonometric, logarithmic scales inscribed on a movable mount and adjustable relative to said stationary mount to thereby greatly facilitate both accurate and rapid solutions to standard air navigational problems.

A further object of the invention is in the utilization of an improved aerial computer that combines in a single device the logarithmic and trigonometric, logarithmic scales considered essential to the solution of air navigation problems and which are further combined in a uniquely cooperative arrangement with a compass indicator, a novel relative bearing pointer element and a novel system of cursor elements collectively enabling improved air navigation without requiring the pencil markings of the more conventional types of aerial computers.

Other objects and advantages of the invention will become readily apparent from the following description, taken in connection with the accompanying drawings, in which:

Description of the preferred embodiment

Figure 1:
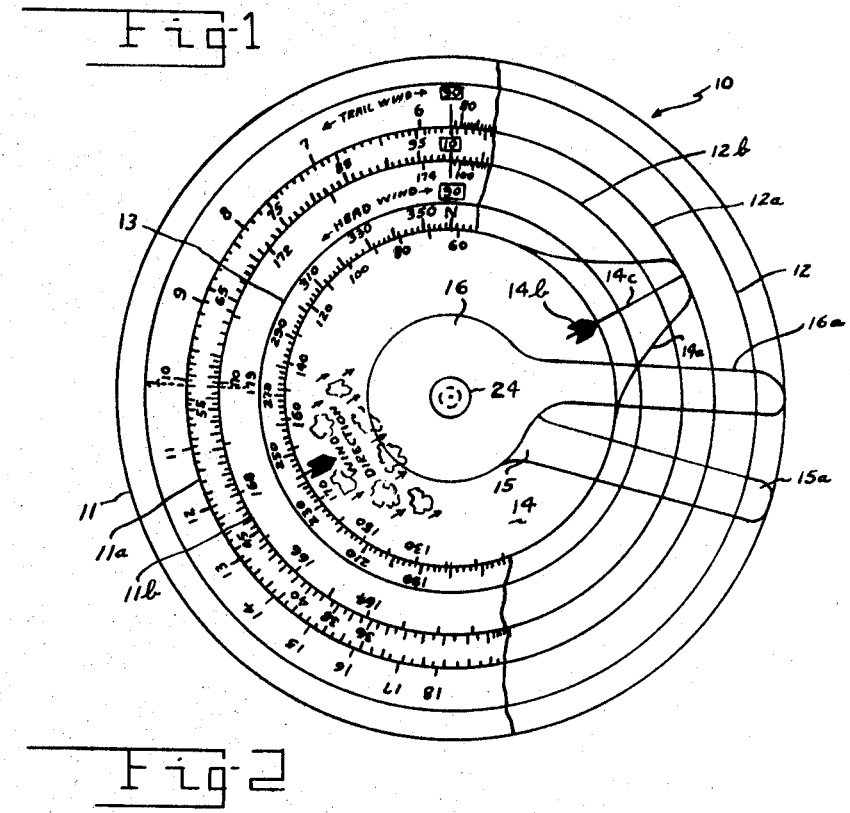
FIGURE 1 is a top view, illustrating the fully assembled condition of the air navigation computer of the present invention and, in particular, showing the specific relation between the improved combination of scales and cursor elements used therewith.
Figure 2:
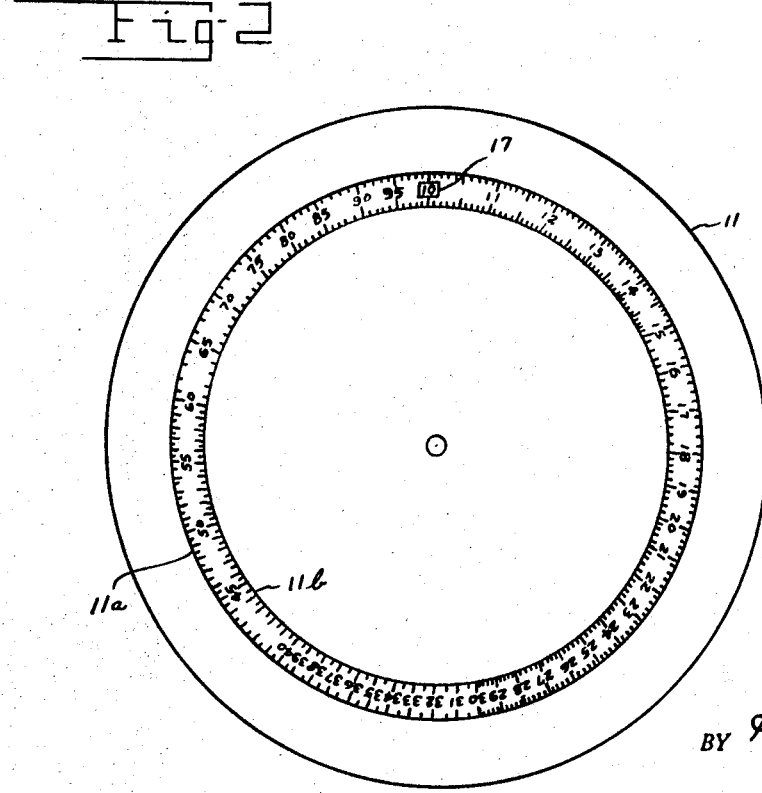
FIGURE 2 is another top view, separately illustrating the non-transparent base disc element used in the overall assembly of FIGURE 1, to thereby more clearly depict the pair of conventional logarithmic scales inscribed on the upper surface thereof.

Referring to the drawings and, in particular, to FIGURE 1 thereof, the aerial computer of the present invention is generally shown in its fully assembled condition at 10 as including the principal components of a base disc 11, a trig ring 12, a compass indicator 13, a relative bearing pointer 14, and a pair of identical cursor pointers at 15 and 16. The aforesaid base disc 11, which provides the main support for the remaining components of the present computer, may be constructed of a suitable white plastic material formed into a circular disc of a constant thickness of $\frac{1}{16}$ of an inch and 5 inches in overall diameter. This disc may be seen more clearly in FIGURE 2 as being inscribed with two scales at 11a and 11b. These scales are identical, concentrically arranged logarithmic scales that are spaced $\frac{1}{4}$ of an inch apart and respectively positioned on 4 inch and $3\frac{1}{2}$ inch diameters, as measured through the center of the disc. Outer scale 11a is positioned $\frac{3}{4}$ of an inch inwardly of the disc circumferential edge. The indices of both scales 11a, 11b are oriented on identical radials projected from the center of the disc and each ten units thereof is marked with an antilogarithmic numeral that varies in value from 10 through 95, when measured in the clockwise direction. The numeral 10 is inscribed at the top of the aforesaid pair of logarithmic scales 11a, 11b and is enclosed with an index mark 17 that is directed to, and is in alignment with the corresponding indices of both scales. Any number on this scale can be used to represent any multiple of 10, just as with any slide rule.

Figure 3:
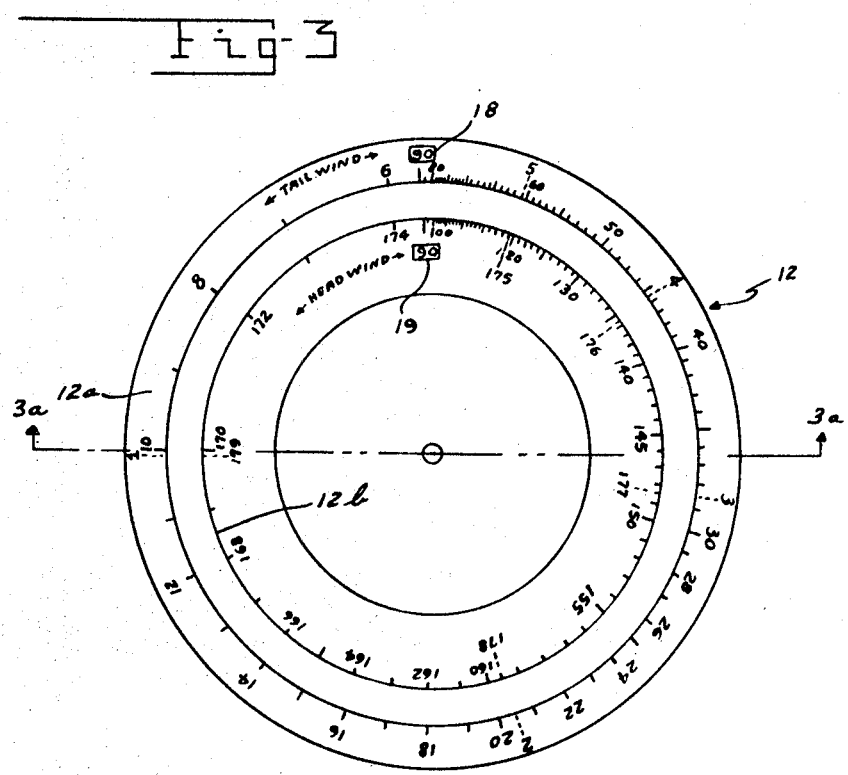
FIGURE 3 is still another top view, showing the transparent trig ring element that is rotatably positioned on the base disc element of FIGURE 2, with the top surface thereof depicted in blank form to thereby better illustrate the spaced-apart, trigonometric, logarithmic scales that are inscribed on the bottom surface thereof.
Figure 3A:
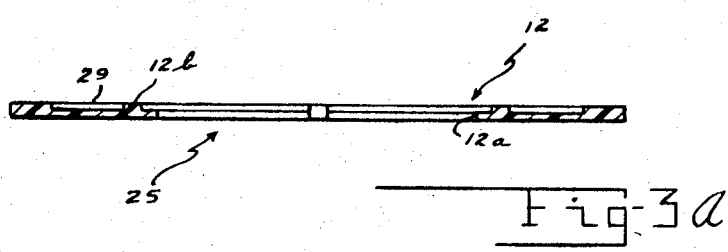
FIGURE 3a is a side elevational and cross-sectional view, taken about on the line 3a–3a of FIGURE 3, to thereby illustrate details of the top surface configuration of the trig ring element which has been uniquely formed to facilitate the assembly of the present computer.
Figure 8:
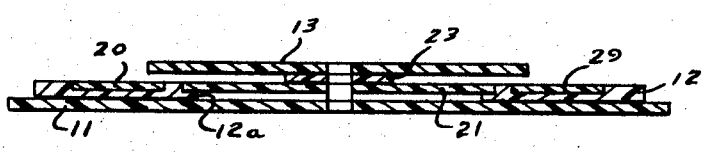
FIGURE 8 is a second side elevational and cross-sectional view, illustrating the trig ring, compass indicator and cursor ring components of FIGURES 3, 4 and 6, respectively combined in a unique manner with an improved internal friction disc element to thereby ensure the proper assembly and operation of the present computer.

Superimposed over the base disc 11 is the previously noted trig ring 12, illustrated in greater detail in FIGURES 3 and 3a. This element, which forms one of the key features of the invention, consists of a transparent plastic circular ring which is rotatably mounted on base disc 11 and includes outside and inside diameters of $4\frac{5}{8}$ inches and $2\frac{1}{8}$ inches, respectively. As illustrated in FIGURE 3a, trig ring 12 is made of a flat configuration on its underside surface, indicated generally by the reference numeral 25, which faces downwardly towards the base disc 11 when in assembled condition. However, trig ring 12 is made of variable thickness and, accordingly, its top surface is of a configuration designed to facilitate the incorporation therewith of the cursor ring 20 (note FIGURE 6) and a suitable internal friction disc element that provides frictional engagement between trig ring 12 and base disc 11. For this purpose, and as seen in FIGURES 7 and 8, the said internal friction disc 21, which is stationary relative to the base disc 11, is made of a relatively enlarged diameter to thereby provide an outer circumference designed to overlap the top inside edge of the inside diameter edge of the trig ring 12, as will be described in more detail hereinafter. Said internal friction disc 21, which may consist of an internal component $\frac{1}{32}$ of an inch thick and $2\frac{3}{8}$ inches in diameter, is designed to just fit snugly and resiliently against the top, inside edge of the trig ring 12. Thus, with the above described configuration, the central portion of the relatively enlarged friction disc 21 is positioned adjacent to, and when the present computer is fully assembled, in frictional contact with the top surface of the base disc 11. Moreover, the previously described overlapping outside circumferential edge of said disc 21 presses downward on the inside diameter edge of the trig ring 12, as will be described in more detail hereinafter. To ensure that the above-noted necessary frictional and holding force is provided, a relatively reduced diameter, internal disc 23 is laminated to the underside of the compass indicator 13, as is seen in the aforesaid FIGURES 7 and 8. Thus, when the compass indicator 13 is in its assembled position, disc 23 creates the previously mentioned frictional and holding force by causing the central portion of the friction disc 21 to deflect a relatively slight amount to thereby contact the top surface of the base disc 11 with a force sufficient both to retain the trig ring 12 in position and maintain the desired stationary relationship therebetween.

To specifically accommodate the previously noted cursor ring 20 and provide for the above described frictional engagement between the base disc 11 and the trig ring 12, the latter is made with its top surface of a configuration specifically designed to accommodate the particular configuration of friction disc 21 and support cursor ring 20 in slaved relation thereto. To this end, the thickness of trig ring 12 is made to vary from $\frac{1}{16}$ of an inch extending inwardly from its outside circumference to the 4 inch diameter mark, from whence it is reduced to $\frac{1}{32}$ of an inch further inwardly to the $2\frac{5}{8}$ inch diameter mark, at which point it returns to $\frac{1}{16}$ of an inch in thickness that extends from the $2\frac{5}{8}$ inch diameter mark to the $2\frac{3}{8}$ inch diameter mark. Finally, the thickness reduces once again to $\frac{1}{32}$ of an inch from the $2\frac{3}{8}$ inch diameter mark to the inside diameter edge of the ring. Thus, with the foregoing arrangement of a variable thickness, the upper or top surface of trig ring 12 is specifically formed, as seen particularly in FIGURE 3a, with a circular recess portion at 29 of a depth of $\frac{1}{16}$ inch and of an overall size adapted to just accommodate the said cursor ring 20 therein, as seen in FIGURE 8, and thereby provide the previously noted slaved rotation between the trig ring 12 the the cursor ring.

In the aforesaid view of FIGURE 8, the trig ring 12 is shown in mounted position on the base disc 11, with the cursor ring 20 depicted as being snugly fitted within the previously described circular recess 29 formed in the top surface of the trig ring. The relatively enlarged internal friction disc 21 is shown mounted with its circumference resting in overlapping relation to the inside diameter edge or inside lip portion of the trig ring 12, shown at 12a, preparatory to the central portion thereof being deflected or distorted downwardly to the previously mentioned frictional contact with the top surface of the base disc 11 through the downward pressure applied thereto by the internal disc 23 laminated to the underside of the compass indicator 13. During the assembly of the present computer, the latter element is moved to a position of rest directly on top of the relatively narrow and circularly-disposed, upright element at 12b, which comprises the inner boundary of the recess 29 formed in the top surface of the trig ring 12. The diameter of compass indicator 13 is deliberately made sufficiently large enough to overlap the cursor ring 20 and thereby retain the latter element in position in the said recess 29, as illustrated in the aforesaid FIGURE 8. Furthermore, because of the overlapping relationship between the circumference of the relatively enlarged internal friction disc 21 and the inner diameter edge or inside lip 12a, the trig ring 12 is likewise pressed firmly and held on the base disc 11. In this manner, the compass indicator 13 is actually positioned adjacent to the cursor ring 20, the trig ring 12, and the outer circumference of the friction disc 21.

The flat underside surface of trig ring 12 is inscribed with two trigonometric, logarithmic scales; namely, outer scale 12a and inner scale 12b, each scale reflecting cosecant values in degrees. The trigonometric indices, inscribed with antilogarithmic numerals, are placed or positioned in concentric relation to each other on a 4 inch and 3½ inch diameter, respectively. In addition, each scale is inscribed with an index in which are contained the 90 degree indice marks and which are indicated respectively at 18 and 19. Outside scale 12a contains degree values from 90 through 1 degree, and inner scale 12b contains degree values from 90 to 179 degrees. The 90 degree indices of both scales are oriented on the same radial projected from the center of the ring. As can be observed through the thickness of the trig ring 12, each scale 12a, 12b indicates degree values which are arranged in descending order on the outer scale 12a, and in ascending order on the inner scale 12b, when measured in the clockwise direction. Scale values from 5 to 1 degree on outer scale 12a, and from 175 to 179 degrees on inner scale 12b are placed on dotted, extended indices (as shown in FIGURE 3) because they exceed one complete rotation of the circumference of the trig ring 12 and, as such, overlap other degree indices. Outer and inner scales 12a, 12b are respectively notated with the words "Tail Wind," and "Head Wind."

Figure 4:
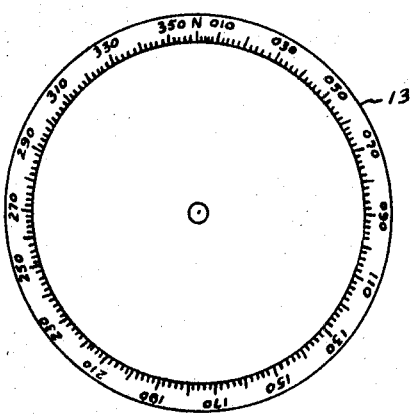
FIGURE 4 is an additional top view, illustrating the conventional compass indicator which forms part of the overall assembly of FIGURE 1 and which is, however, mounted in fixed relation to the base disc element.
Figure 5:
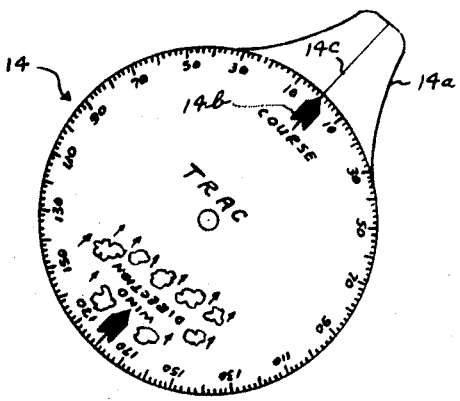
FIGURE 5 is a still further top view, clearly showing details of the unique relative bearing pointer of the invention, and the degree scale inscribed thereon.

The compass indicator 13 and relative bearing pointer 14 are more clearly shown in FIGURES 4 and 5, respectively. Compass indicator 13 consists of white disc that is 1/32 of an inch in thickness and 2⅞ inches in diameter. This unit is mounted stationary relative to the base disc 11 and is inscribed with the usual 360 degrees of the compass rose. Every two degrees are indexed around a circumference that measures 2½ inches in diameter, and moreover, each 20 degree interval is notated with the appropriate numeral.

The relative bearing pointer 14 of FIGURE 5 consists of a transparent, disc-shaped unit that is made 1/32 of an inch thick with a 2½ inch diameter. It is equipped with an integrally-formed curved extension portion at 14a which terminates at a point measuring 2 inches from the center of the disc. The outside circumference of the pointer 14 is inscribed with 2 degree indices and each 20 degree interval is notated with numerals varying from 10 to 170 degrees in both clockwise and counterclockwise directions, as measured from a course indicator index indicated by the reference numeral 14b and further denoted by the word "course." This course indicator index is placed at the zero degree point and is further aligned with a cursor line 14c extending through the center of the curved extension portion 14a. The opposite side of this disc, at the 180 degree point, is inscribed with a wind heading indicator means, and a pictorial representation of the direction of cloud movement to ensure that it is understood that the inscription depicting wind direction represents the direction from which the wind is blowing.

Figure 6:
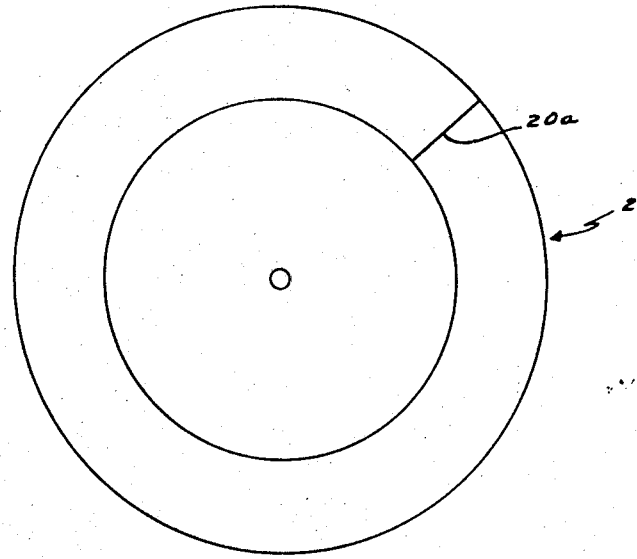
FIGURE 6 is an additional top view, illustrating the cursor ring element that is not shown in the top view of FIGURE 1, but which, however, is positioned over the trig ring of FIGURES 3 and 3a, and which is normally slaved to the rotation of said trig ring.
Figure 7:
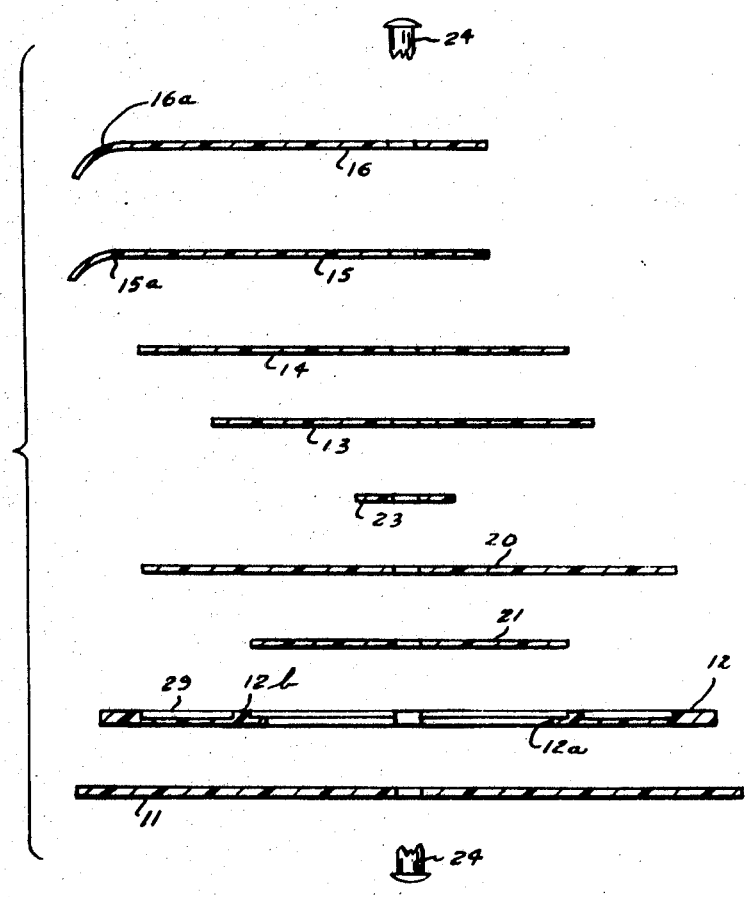
FIGURE 7 represents an exploded cross-sectional view, generally illustrating certain additional details of the overall assembly, of the invention of FIGURE 1 and, in particular, depicting the relative position of the principal components of the present aerial computer, prior to their complete assembly into a fully operative device.

The present aerial computer also includes a cursor ring, shown at 20 in FIGURE 6. This ring is not visible in the fully assembled view of FIGURE 1. It consists of a transparent ring 1/32 of an inch thick with outside and inside diameters of 4 inches and 2⅝ inches respectively. This unit has one inscribed index or reference line at 20a which is projected on a single radial extending from the center of the ring. In operation, the cursor ring 20 is normally slaved to the rotation of the trig ring 12 and, therefore, turns an equal degree value with the trig ring. However, it may be independently set to various positions relative to, and thus without correspondingly moving the trig ring 12, as will become more apparent with regard to the description of FIGURE 7.

Referring particularly to the aforesaid FIGURE 7, the relative positioning of the various principal components of the inventive aerial computer is still further illustrated. Moreover, certain additional components are likewise shown. Thus, it is again clearly seen that the trig ring 12 is positioned immediately over the base disc 11, and the relatively enlarged, friction disc at 21 is utilized to place friction upon the trig ring 12 by way of its engagement with the top inside edge of the trig ring 12, as noted hereinbefore.

Immediately above the compass indicator 13 is positioned the previously described relative bearing pointer 14 and, finally, on top of the entire computer are respectively positioned the previously noted pair of cursor pointers 15 and 16. These units are made of a transparent plastic material, 1/32 of an inch in thickness and 1¼ inches in diameter, measured at the center or pivot point of the computer. Each cursor pointer 15, 16 also incorporates a relatively elongated tip portion, indicated respectively at 15a and 16a, that measures 2½ inches from the pivot point and is 5/16 of an inch in width. In addition, each of said tip portions terminates in a downwardly curved portion (note FIGURE 7) that is designed to press firmly upon the outside circumferential edge of the base disc 11. Further, in preparing the inventive computer for operation, the aforesaid cursor pointers may be positioned in an offset relative to each other, with pointer 15a, for example, offset in clockwise direction and pointer 15b offset in a counterclockwise direction. In this manner, each of said cursor pointers has the effect of extending one line that is projected on a single radial from the computer pivot center. To this end, and to facilitate appropriate adjustment of cursor pointers 15, 16, each of the latter may incorporate an index or marking line (not shown), or, as illustrated in the present case, one edge of each tip portion 15a, 16a, may simply be formed in direct alignment with a radial projected from the pivot center.

A center fastening rivet at 24 (FIGURE 7) may be used to attach together the previously described components of the present aerial computer. To accommodate rivet 24, all components parts, except trig ring 12 and cursor ring 20, may be drilled with a 3/16 inch hole at the computer's center pivot point. In addition, two 1/16 inch holes may be drilled through the internal friction discs 21 and 23 on opposite sides of the pivot point on a ½ inch diameter, and 1/32 inch deep into the top side of the base disc 11. These two holes may also be drilled through the smallest internal disc, namely disc 23, prior to its lamination to the compass indicator 13. Two plastic pegs, 1/16 inch in diameter and 3/32 inch in length, may then be inserted into the two drilled holes, during assembly, to thereby insure that the compass indicator 13 and the internal disc remain stationary relative to base disc 11. Use of the above indicated assembly technique provides a low replacement capability for any component part.

The various applications and operating procedures involved in the use of the present air navigation computer will now be described in detail hereinafter, primarily with reference to FIGURE 1 as follows:

(1) Determining ground speed and wind drift (a) Align the wind direction arrow on the relative bearing pointer 14 with the wind heading on the compass indicator 13 and read the angular measurement on the relative bearing pointer adjacent to the angle on the compass indicator that represents the desired course of the aircraft.

(b) Turn the trig ring 12 until the same angular measurement appears over the wind velocity on the scale of base disc 11.

(c) Turn the cursor ring 20 until the cursor line 20a inscribed thereon is placed over the aircraft's true airspeed and read the degrees of drift on the trig ring.

(d) Turn the trig ring 12 until the number of degrees of drift is *added* to the degree value over the wind velocity on the base disc scale and read the ground speed under the line 20a on the cursor ring 20.

(2) Determining wind direction and velocity (a) On the scale of base disc 11, place one cursor pointer 15 or 16 over the ground speed and the other cursor pointer 15, 16 over the true airspeed.

(b) Turn the trig ring 12 until the difference between the angular readings under the cursor pointer 15, 16 is equal to the number of degrees of wind drift.

(c) Determine the wind direction by turning the wind direction arrow inscribed on the relative bearing pointer 14 from the aircraft's track, through the aircraft's heading, until the two angular measurements reflected under the cursor pointers 15, 16 on the trig ring 12 are respectively positioned adjacent to the aircraft's heading and track on the compass indicator 13.

(d) Read the wind direction on the compass indicator 13 adjacent to the wind direction arrow. Note: If the ground speed is greater than the true airspeed, the outside scale 12a of the trig ring 12 is used; if the ground speed is less than the true air speed, the inside scale 12b is used.

(e) Determine the wind velocity by: (1) placing the curved extension portion 14a of the relative bearing pointer 14 over the number of degrees of drift on the trig ring 12; (2) reading the angular displacement under one of the cursor pointers 15, 16 on the relative bearing pointer; (3) turning the course indicator index arrow 14b until the same angular displacement is read under the opposite side of the other cursor pointer; and (4) reading the wind velocity under the curved extension portion 14a on the base disc scale.

(3) Direct course TACAN tracking procedures

Note: In tactical air navigation (TACAN), the pilot/navigator receives information both as to the distance and bearing of his aircraft from a selected TACAN ground station which produces a theoretically infinite number of radials emanating from the station like the spokes of a wheel. The procedure of using the present computer with such a TACAN station is as follows:

(a) Using the TACAN station as a point of reference, initially the number of degrees between a destination radial and a departure radial is determined by placing the course indicator index arrow 14b of the relative bearing pointer 14 over the degree value representing the destination radial on the compass indicator 13. Adjacent to the departure radial on the compass indicator, note is made of the angular measurement corresponding thereto on the relative bearing pointer, 14.

(b) Using the scale of the base disc 11 as a mileage indicator, one cursor pointer 15, 16 is placed over the destination distance from the TACAN station; and the second cursor pointer is placed over the departure point distance from the same TACAN station.

(c) The trig ring 12 is then rotated until the difference between the degree indices respectively appearing under the cursor pointers 15 and 16 is equal to the angular measurement between the destination and departure radials (note step a above). The degree reading under the cursor pointer set on the departure point mileage is the number of degrees, to the right or left of the magnetic bearing to the TACAN station, needed to track directly to the destination point.

(d) The course indicator index arrow 14b of the relative bearing pointer 14 is next turned from the destination radial, toward the magnetic bearing to the TACAN station, until the angular measurement to the destination point (step c above) is adjacent to the magnetic bearing to the TACAN station. The degree reading on the compass indicator 13, under the course indicators index arrow 14b, indicates the magnetic course to the destination point.

By use of the present computer, continuous, direct tracking can be accomplished by noting the angular measurement on the relative bearing pointer 14 which corresponds to the magnetic bearing, to the TACAN station, on the compass indicator 13. The desired "on course" distance is then read on the scale of the base disc 11 under the angle on the scale of the trig ring 12 which is equal to the value derived from the relative bearing pointer 14. If the actual aircraft distance from the TACAN station is greater than the "on course" distance, a correction is made toward the TACAN station side of the desired track; if the actual distance is less, a correction is made away from the TACAN station side of the desired track.

To determine the distance from the aircraft to the destination point, one cursor pointer 15, 16 is retained over the destination distance from the TACAN station and the other cursor pointer is placed over the angle on the scale of the trig ring 12 which indicates the present position mileage. The curved extension portion 14b of the relative bearing pointer 14 is next placed over the trig ring scale value which reflects the difference between the degree values appearing under the two cursor pointers 15, 16. On the relative bearing pointer 14, the angular measurement under the closest cursor pointer is read, and the relative bearing pointer is turned until this same value appears on the opposite side of the second cursor pointer. The distance to go on the base disc scale appearing under the relative bearing pointer 14 is thereafter read, and the course indicator index arrow 14b is reset to the desired course for further tracking.

Thus, the air navigation computer of the present invention constitutes a new and improved device that is pilot-oriented, capable of one hand operation, and designed to substitute for the "wind face" side of existing circular slide rule computers. Moreover, the present device is uniquely adapted both to solve the usual wind vector problems involved in air navigation and to provide improved capability in connection with tactical air navigation (TACAN) to facilitate the accomplishment of a point-to-point, direct tracking capability.

For long range navigation involving more than one TACAN station, direct tracking can be easily achieved with the present computer by drawing a course line on an appropriate aeronautical chart, and measuring the perpendicular distances from this course line to each of the more than one TACAN station to be used enroute. Then, by setting the 90 degree indices, as at 18, 19, of the trig ring 12 over these measured distances on the base disc scale, in the consecutive order that each station is used, direct tracking can be accomplished by using the procedures described hereinabove.

I claim:

1. In an air navigation computer, apparatus for computing ground speed and wind drift comprising a stationary base element inscribed with logarithmic scales constituting a slide rule marked with indicia graphically representing variations in speed and distance; a first movably-mounted element positioned adjacent said base element and inscribed with trigonometric, logarithmic scales disposed adjacent and in alignment with the logarithmic scales of said base element, said first movably-mounted element adapted to be adjusted relative to said base element to an initial position of adjustment to align a given wind velocity found on said base element scale with a particular angular movement marked on said first movably-mounted element and previously determined from the aircraft's desired true course and corresponding to a given wind direction; a second movably-mounted element constituting a cursor means positioned for normally-slaved rotation with said first movably-mounted element and inscribed with a single radial reference line, said cursor means being adapted for initial adjustment independently of said first movably-mounted element to thereby adjust its reference line to a position directly over the indice on the base element logarithmic scale representing the aircraft's true airspeed and further aligned with the indice on said first movably-mounted element corresponding to the degrees of wind drift resulting from the given wind direction and velocity; a stationary compass indicator inscribed with 360° positioned adjacent to said cursor means; and a third movably mounted element positioned in superimposed relation to said compass indicator and inscribed with indicia arranged into a degree scale varying from 0–180° in both clockwise and counterclockwise directions and further marked with a course indicator arrow at the zero degree indice and a diametrically-opposed wind direction arrow at the 180 degree indice and having a curved extension portion overlying the scales on said first movably-mounted element, said base element and said compass indicator; said third movably-mounted element being adjustable relative to said compass indicator to align the wind direction arrow inscribed thereon with a given wind heading on said compass indicator to thereby determine from the indice on said third movably-mounted element positioned directly opposite the aircraft's true course on said compass indicator the particular angular measurement to be subsequently aligned by adjustment of said first movably-mounted element with the given wind velocity on said base element scale; said first movably-mounted element and said cursor means being thereafter moved in combined, slaved relation to each other to a second position of adjustment relative to said base element in an amount just sufficient to add the previously-determined degrees of wind drift to the particular angular measurement corresponding to the given wind velocity and true course and thereby effect alignment of the cursor means radial reference line with the indice on said base element scale representing the aircraft's ground speed.

2. In an air navigation computer as in claim 1, wherein said base element comprises a non-transparent plastic, circular disc inscribed with a pair of identical concentrically-arranged, logarithmic scales further marked with antilogarithmic numerals, and said first movably-mounted element comprises a transparent plastic, trig ring member rotatably positioned on said base element with the trigonometric, logarithmic scales inscribed thereon being arranged in a pair of concentrically-positioned scales disposed on opposite sides of, and in direct alignment with, the logarithmic scales of said base element, and varying in the clockwise direction respectively from 90° through 1° on one scale and from 90° through 179° on the second scale.

3. In an air navigation computer as in claim 2, wherein said circular disc, base element incorporates an internal friction disc engaged between said base element and said trig ring member to thereby apply friction therebetween.

4. In an air navigation computer as in claim 1, wherein said first movably-mounted element comprises a trig ring inscribed with a pair of concentrically-arranged trigonometric, logarithmic scales, and said cursor means constitutes a cursor ring member having means frictionally engaging said cursor ring to said trig ring and permitting both normally-slaved rotation therebetween and independent adjustment of said cursor ring.

5. In an air navigation computer as in claim 4, wherein said frictionally engaging means comprises a first internal friction disc having a central disc portion adapted to be moved to an engaged position with the top surface of said base element and further disposed within the trig ring in overlapping engagement with the top, inside circumference thereof, and a second internal disc mounted to said compass indicator and adapted to engage with, and urge said first internal friction disc to its base element-engaged position to thereby simultaneously maintain said trig ring in supporting and frictional contact on said base element and said compass indicator in stationary relation relative thereto.

6. In an air navigation computer as in claim 1, wherein said third movably-mounted element comprises a relative bearing pointer having a curved extension tip portion at the course indicator arrow side thereof adapted to overlie both the logarithmic scales of said base element and the trigonometric, logarithmic scales of said first, movably-mounted element to thereby facilitate respective adjustment therebetween.

7. In an air navigation computer as in claim 2, and a pair of cursor pointer elements adapted for adjustment in offset relation relative to said base element and respectively adjustable to the aircraft's ground speed and true airspeed indices on said base element scale, said trig ring member being adjustable to a first angular position relative to said cursor pointer element and corresponding to a predetermined wind drift angle, and the wind direction arrow of said third movably-mounted element being adjustable relative both to said trig ring member and the respective positions of said cursor pointer elements to a second angular position corresponding to the aircraft's heading and track, the angular indice thereafter found on said compass indicator opposite the adjusted position of said wind direction arrow constituting a measure of the computed wind direction, said third movably-mounted element further having a tip portion that is adjustable to the said wind drift angle to thereby determine an angular measurement from the indice on said trig ring member positioned directly under one of said cursor pointer elements, and said course indicator arrow being thereafter adapted for adjustment in relative position until the same angular measurement appears directly under the opposite side of the other of said cursor pointer elements, said tip portion being thereby further adjusted to a position over the indice on said base element scale representing the computed wind velocity.

8. In an air navigation computer as in claim 1, wherein the first movably-mounted element of said apparatus comprises a trig ring member positioned for rotation relative to said base element, said second movably-mounted element constitutes a cursor ring member positioned in superimposed and normally slaved relation to the rotation of said trig ring member and wherein said trig and cursor ring members incorporate internal friction disc means interposed therebetween to ensure relative adjustment between said members, and said third movably-mounted element consists of a relative bearing pointer formed into a circular disc element and adjustably positioned for rotation relative to said compass indicator and said base element.

9. In an air navigation computer as in claim 8, wherein said relative bearing pointer comprises means adapted to provide the continuous direct course tracking of an aircraft by reference to a selected TACAN ground station used in tactical air navigation and emanating radials about a 360° arc that present information as to both bearing and distance of the aircraft from the selected station, said relative bearing pointer having a curved extension tip portion, a course arrow at the zero indice mark and a wind direction arrow at the 180° indice mark, and being rotatable to an angular position to thereby adjust its course arrow to an aligned position with the indice on said compass indicator representing the angular difference between the departure and destination radials emanating from the same TACAN ground station to thereby determine a particular angular measuremment appearing on said relative bearing pointer opposite the departure radial degree value on the compass indicator; and a pair of cursor pointers mounted for adjustment in angular relation to said base element, said cursor pointers thereby being adapted for respective rotation to aligned positions over the destination and departure point distances from the selected ground station; said trig ring member being thereafter adapted for adjustment in position until the difference in the angles respectively appearing under the adjusted positions of said cursor pointers is made equal to the same angular difference previously measured between the departure and destination radials, the indice mark thereby appearing under the cursor pointer aligned with the departure point distance representing the degrees to the right or left of the magnetic bearing to the selected station required of the aircraft to track to the given destination radial; the said course arrow thereafter being adapted for adjustment from its previously-set position over the destination radial to a second position directed towards the magnetic bearing to the selected station determined from the degree reading appearing under the cursor pointer previously aligned with the departure point distance, said course arrow second position thereby being aligned over the indice on said compass indicator representing the magnetic course to the destination.

References Cited

UNITED STATES PATENTS

| | | | |
|---|---|---|---|
| 2,394,226 | 2/1946 | Baldocchi | 235—78 |
| 2,433,984 | 1/1948 | De Vries | 235—78 |
| 3,034,713 | 5/1962 | Kuzenko | 235—78 |
| 3,262,640 | 7/1966 | Jameson | 235—78 |
| 3,279,695 | 10/1966 | Krause | 235—78 |

STEPHEN J. TOMSKY, Primary Examiner

U.S. Cl. X.R.

235—61